April 12, 1966  A. A. MUEHLING  3,245,176
GRINDING MACHINE Filed June 27, 1963                    12 Sheets-Sheet 1

INVENTOR.
ANTHONY A. MUEHLING
BY
Whittemore, Hulbert & Belknap
ATTORNEYS

April 12, 1966 A. A. MUEHLING 3,245,176
GRINDING MACHINE
Filed June 27, 1963 12 Sheets-Sheet 4

INVENTOR.
ANTHONY A. MUEHLING
BY
Whittemore, Hulbert & Belknap
ATTORNEYS

United States Patent Office 3,245,176
Patented Apr. 12, 1966

3,245,176
GRINDING MACHINE
Anthony A. Muehling, Detroit, Mich., assignor to Mid-West Abrasive Company, Owosso, Mich., a corporation of Delaware
Filed June 27, 1963, Ser. No. 290,996
13 Claims. (Cl. 51—33)

This invention relates generally to metal working machines and refers more particularly to a grinding machine for removing metal from workpieces such as billets and slabs.

One object of this invention is to provide a grinding machine having a carriage movable along a predetermined path, a saddle supported on the carriage for movement transversely of the carriage path, a boom extending in the direction of saddle movement and pivoted to the saddle for vertical swinging and a grinding wheel on the end of the boom. Accordingly the grinding wheel can be moved in transverse directions over the surface of a workpiece by reason of the carriage and saddle movements, and can be raised and lowered into and out of contact with the surface of the workpiece.

Another object is to provide a grinding machine having power mechanism for rotating the grinding wheel through a driving belt, the power mechanism being so arranged that its weight applies a tension on the belt.

Another object is to provide a grinding machine in which the grinding wheel is supported on the outer end of a laterally extending boom, and the power mechanism for rotating the grinding wheel is pivoted in a manner such that its weight will tension the driving belt. Preferably, the center of gravity of the power mechanism will be above and inwardly of the pivot axis.

Another object is to provide a grinding machine in which the boom which supports the grinding wheel and the power mechanism for rotating the grinding wheel are pivoted on the same horizontal axis, and preferably on the same shaft.

Another object is to provide means for relieving the tension on the belt which transmits rotation to the grinding wheel from the power mechanism, which preferably is in the form of a yielding resilient connection between the boom and the power mechanism for varying the angular relationship between the two.

Another object is to provide a power mechanism for rotating the grinding wheel which includes a motor and a transmission separately pivoted on the same shaft, and a connection between the motor and transmission which is adjustable to vary the tension on the drive belt between the motor and the transmission.

Another object is to provide a novel hydraulic system for controlling and operating the various movements of the carriage, saddle and boom.

Other objects and features of the invention will become apparent as the description proceeds, especially when taken in conjunction with the accompanying drawings, wherein:

FIGURE 11 is an elevational view with parts in section, of the boom.

FIGURE 19 shows still another one of the cam devices.

Referring now more particularly to the drawings and especially to FIGURES 1-4, the grinding machine comprises a carriage 10 having wheels 12 and 14 supporting the carriage for movement along a predetermined path on the tracks 16 embedded in the floor. The tracks 16 extend parallel to the lengthwise dimension of the workpiece W supported in fixed position on the stationary work support 18. The workpiece is shown as being in the form of a flat slab, although it will be understood that the machine will grind workpieces of other shapes, such as billets of square cross-section, for example. When the machine carriage moves along the tracks 16, the grinding wheel 20 will grind a path on the workpiece along its length.

The machine also includes a saddle 22 which is mounted on the carriage 10 for movement at right angles to the path of the carriage, a boom 24 mounted on the saddle and extending laterally outwardly in the direction of saddle movement, and the grinding wheel 20 mounted on the outer end of the boom with its axis of rotation parallel to the tracks 16.

The carriage 10 includes a platform 26 which has an operator's station at one side including a control panel 28 and a seat 30. The operator rides on the carriage with the machine and has the various controls at his immediate command for governing the movements of the carriage, saddle and boom. At the opposite side of the carriage, the platform has a pair of parallel generally L-shaped rails 32 which extend at right angles to the carriage path defined by the parallel tracks 16. The saddle has grooves or recesses 34 in its under surface into which the rails 32 extend. The saddle is also provided with rollers 36 and 38 for supporting and laterally guiding the saddle on the rails, and rollers 40 which engage under the rails to prevent the saddle from lifting up from the rails.

The saddle has three upstanding bracket formations 41, 42 and 43 (FIGURES 1, 3 and 9) which have axially aligned journals 44. The aligned or coincident axes of the journals 44 extend parallel to the path of carriage movement defined by tracks 16, and a horizontal pivot shaft 46 extends through the journals.

The boom 24, best seen in FIGURES 1, 2, 9 and 11 is an elongated rigid member which includes the channels 50 rigidly secured together to form an integral unit. The boom extends laterally outwardly in the path of saddle movement and at right angles to the carriage path. Near its inner end, the boom is provided with a pair of depending brackets 52 which are pivoted on the shaft 46 between the saddle brackets 42 and 43 to enable the boom to swing in a vertical plane about the horizontal axis of the shaft.

Near its outer end, the boom has a spindle 54 which extends along the axis of the boom and is supported for rotation about its own axis in bearing sleeves 56 and 58 secured between the channels 50 of the boom. The spindle has a housing 60 at its outer end, and the grinding wheel 20 is supported for rotation on a shaft 62 within the housing. The shaft 62 extends at right angles to the boom axis, and ordinarily is horizontal. However, the shaft 62 may oscillate or tilt back and forth about the longitudinal axis of the boom, as described more fully hereinafter, to cause a similar oscillating movement of the grinding wheel.

In the present instance, the carriage 10 is moved back and forth along tracks 16 by the operation of a hydraulic motor 70 under the control of the operator. The motor 70 is mounted on the carriage platform and has a driving pulley 72 which drives a pulley 74 through a belt 76. The pulley 74 is carried by the transmission 78, and through suitable gearing within the transmission applies driving power to one of the carriage wheels 12. The motor 70 is reversible and therefore by a suitable manual control on the panel 28, the operator can move the carriage back and forth and reverse its direction at will.

The saddle 22 is moved back and forth on the carriage rails 32 and for this purpose a reversible hydraulic motor 80 is provided. Motor 80 is mounted on the carriage platform 26. Through a suitable transmission 82, the motor 80 rotates a sprocket 84 mounted on the carriage to the side of one of the rails 32 and near the inner ends of the rails. There is a second sprocket 86 mounted on the carriage near the outer ends of the rails, and a chain 88 extends over the sprockets. The saddle has a fixed part 90 which is secured to the chain so that through the operation of the motor 80, saddle 22 can be moved along rails 32. By a suitable control on panel 28, the operator can control the operation of motor 80 and reverse it whenever desired to move the saddle any desired distance in either direction.

The boom 24 is capable of pivotal movement in a vertical plane about the axis of shaft 46, and for this purpose a double acting hydraulic piston-cylinder assembly 92 is provided. The assembly 92 includes a cylinder 94, the lower end of which is pivoted on a horizontal pin 96 which pin is parallel to shaft 46. A piston 97 reciprocates within the cylinder, and a rod 98 extends from the piston through the upper end of the cylinder and is pivoted to a bracket 100 on an inward extension 102 of the boom by a pin 104. The extension 102 is in the form of a flat plate permanently secured to one of the channels 50 of the boom. Hydraulic lines 106 and 108 lead to opposite ends of the cylinder 94, so by admitting hydraulic fluid under pressure to one end or the other of the cylinder and exhausting at the opposite end, the boom can be raised or lowered about the axis of shaft 46.

The grinding wheel is rotated at a high rate of speed, and for this purpose a power mechanism 110 is provided. Power mechanism 110 includes a motor 112 having a mounting plate 114 which is pivoted on shaft 46 between the saddle brackets 41 and 42 by brackets 116.

The power mechanism 110 also includes a transmission 118 having a mounting plate 120 pivoted on shaft 46 between the saddle brackets 41 and 42 by brackets 122. The output shaft of motor 112 has a pulley 124 which drives a pulley 126 on the transmission 118 by a belt 128. A housing 129 covers the pulleys and belt. The angular relationship between the motor 112 and transmission 118 can be varied to control the tension on belt 128. For this purpose, a screw 130 is pivoted to the mounting plate 114 for motor 112 by a bracket 132, and extends freely through mounting plate 120 for the transmission 118. Nuts 134 threaded on the screw 130 can be rotated to vary the effective length of the connection provided by screw 130 between mounting plates 114 and 120, to thereby alter the distance between the pulleys 124 and 126 to control belt tension.

Figure 1:
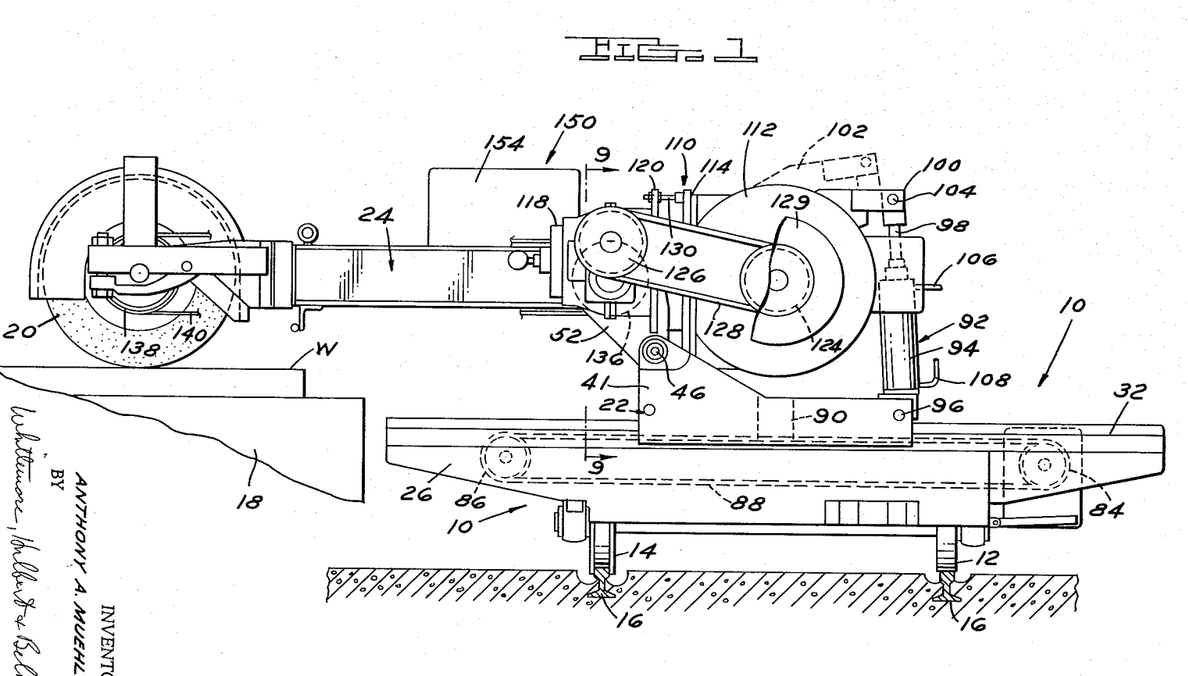
FIGURE 1 is an elevational view of a grinding machine embodying my invention, with parts broken away.
Figure 2:
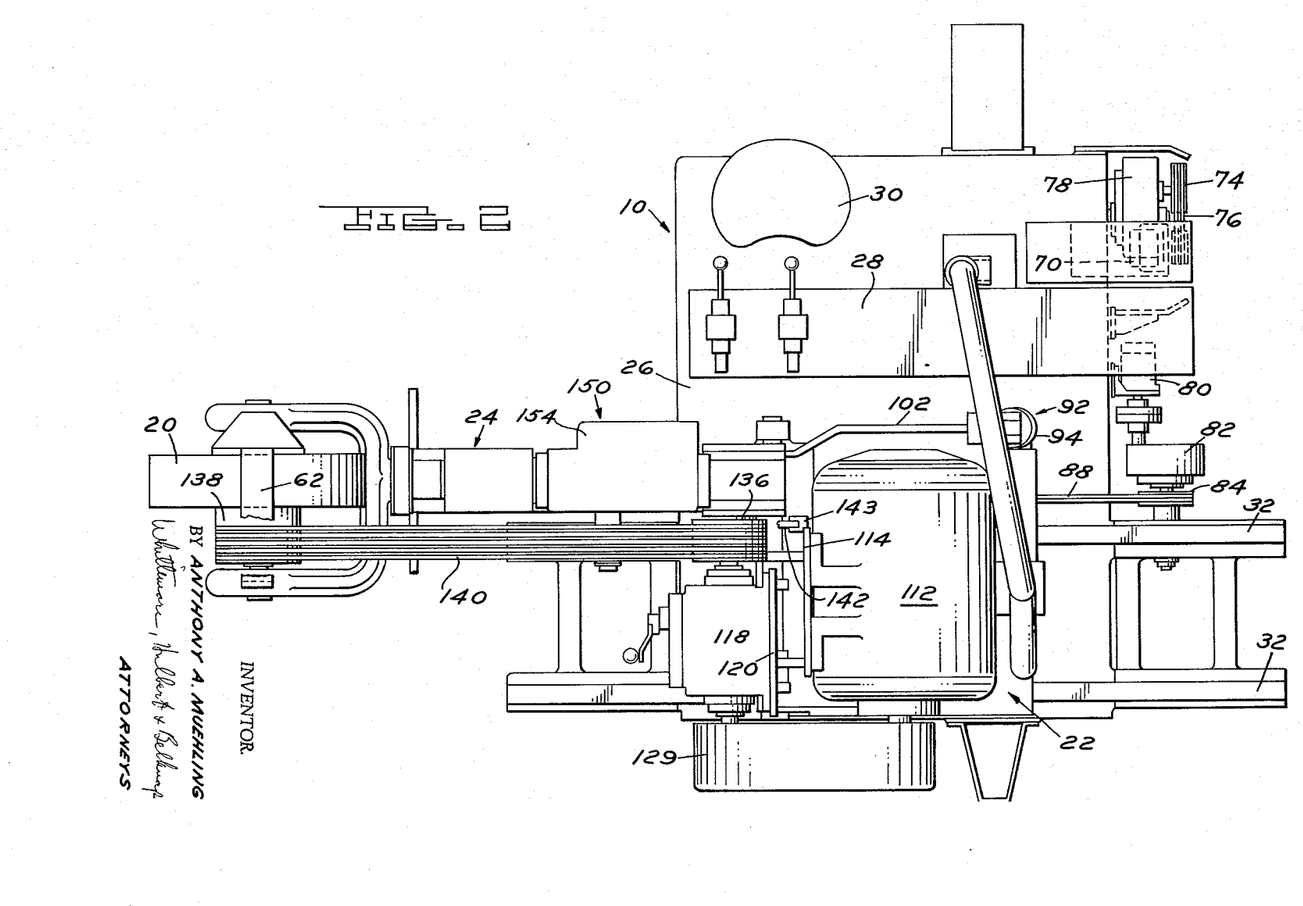
FIGURE 2 is a top plan view of the grinding machine shown in FIGURE 1.
Figure 3:
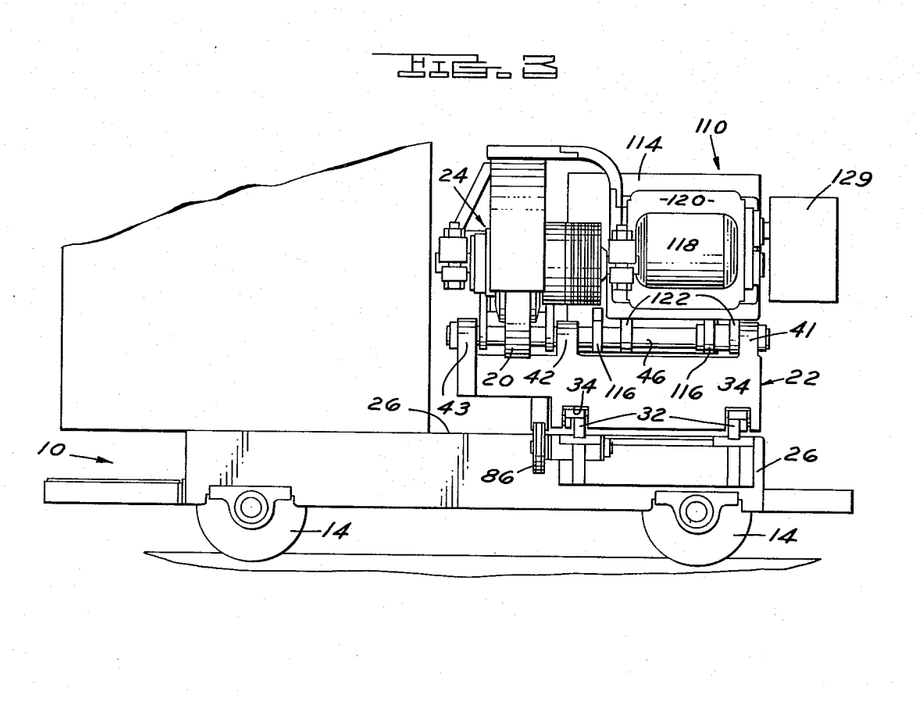
FIGURE 3 is a front view of the grinding machine looking towards the right in FIGURES 1 and 2.
Figure 4:
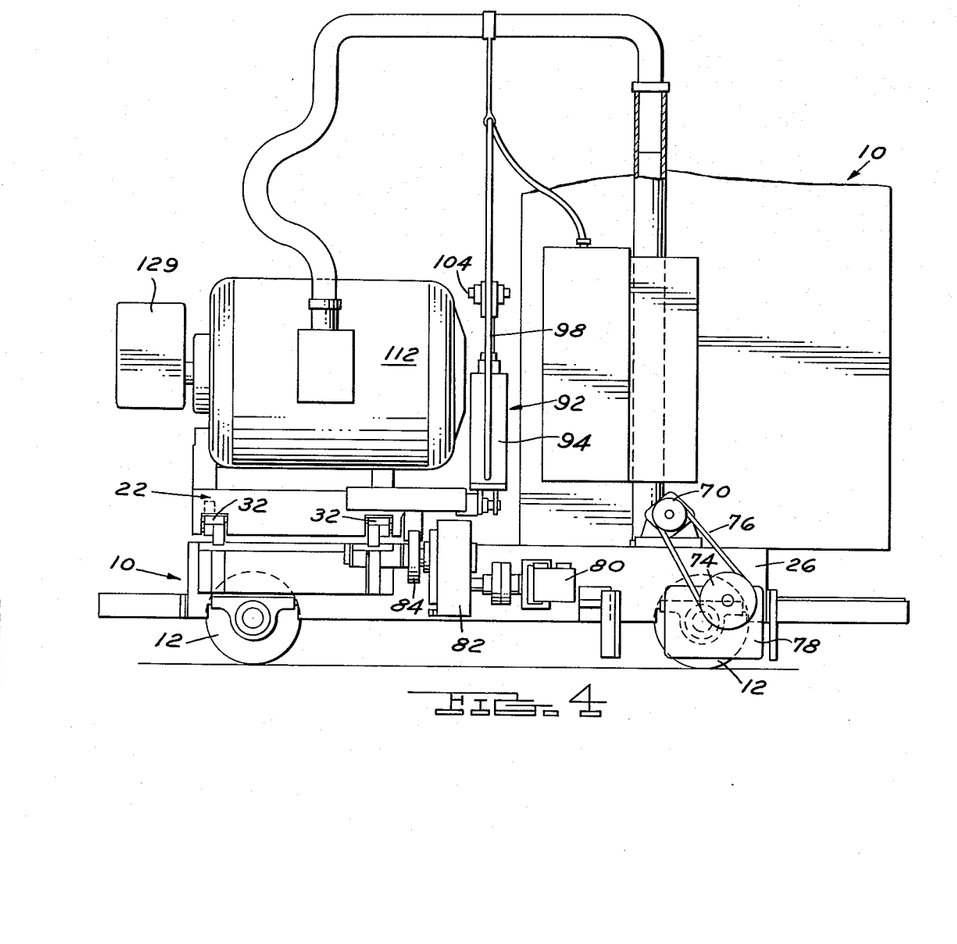
FIGURE 4 is a rear elevational view.
Figure 5:
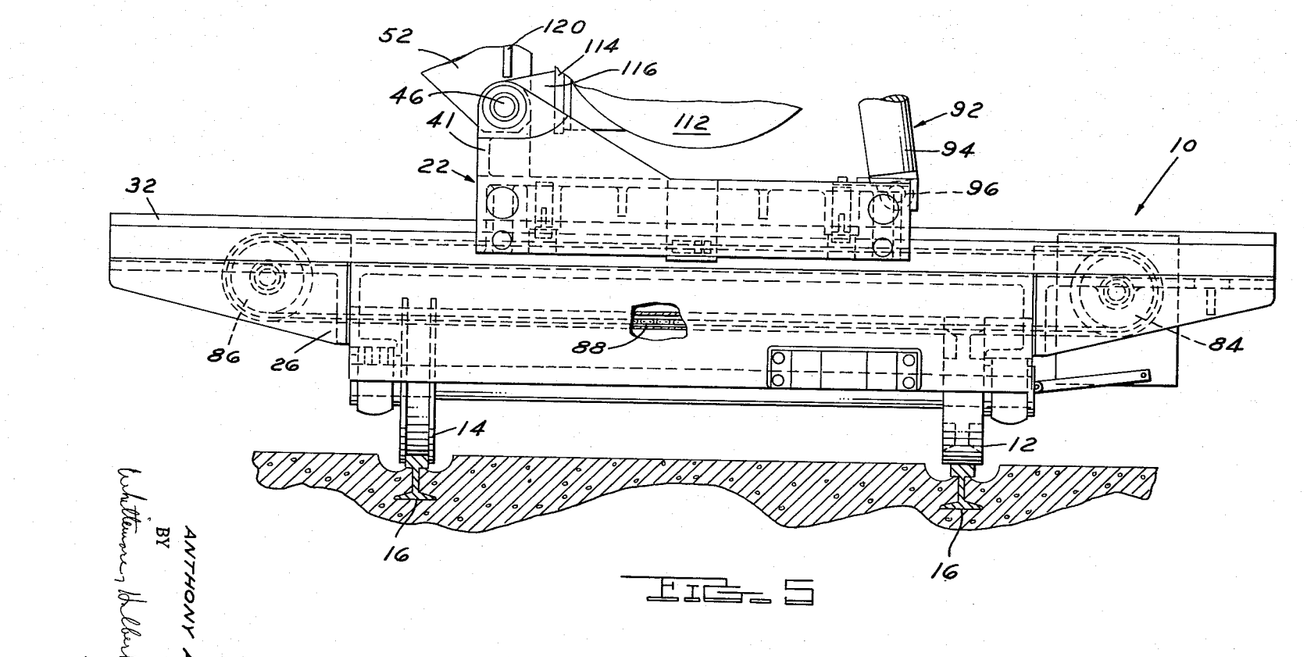
FIGURE 5 is an enlarged fragmentary view with parts in section of a portion of FIGURE 1.
Figures 6, 7:
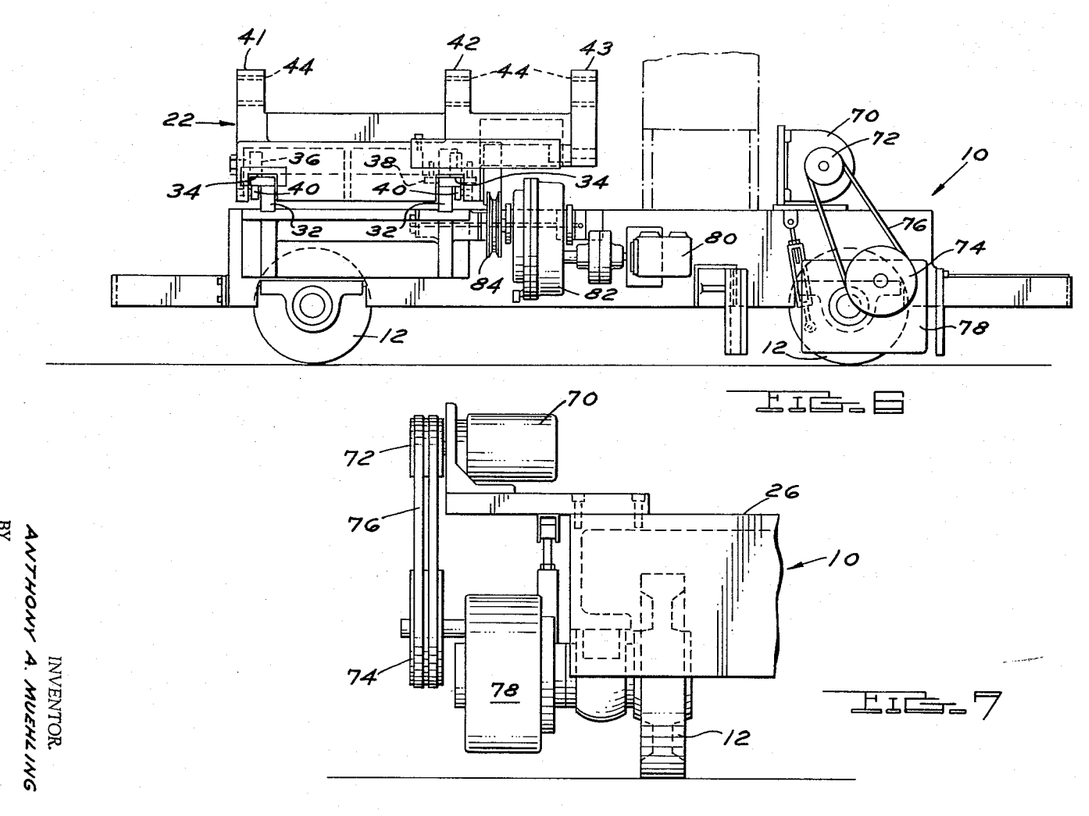
FIGURE 6 is an enlarged fragmentary elevation of a portion of FIGURE 4.
FIGURE 7 is a fragmentary view looking towards the left in FIGURE 6.
Figure 8:
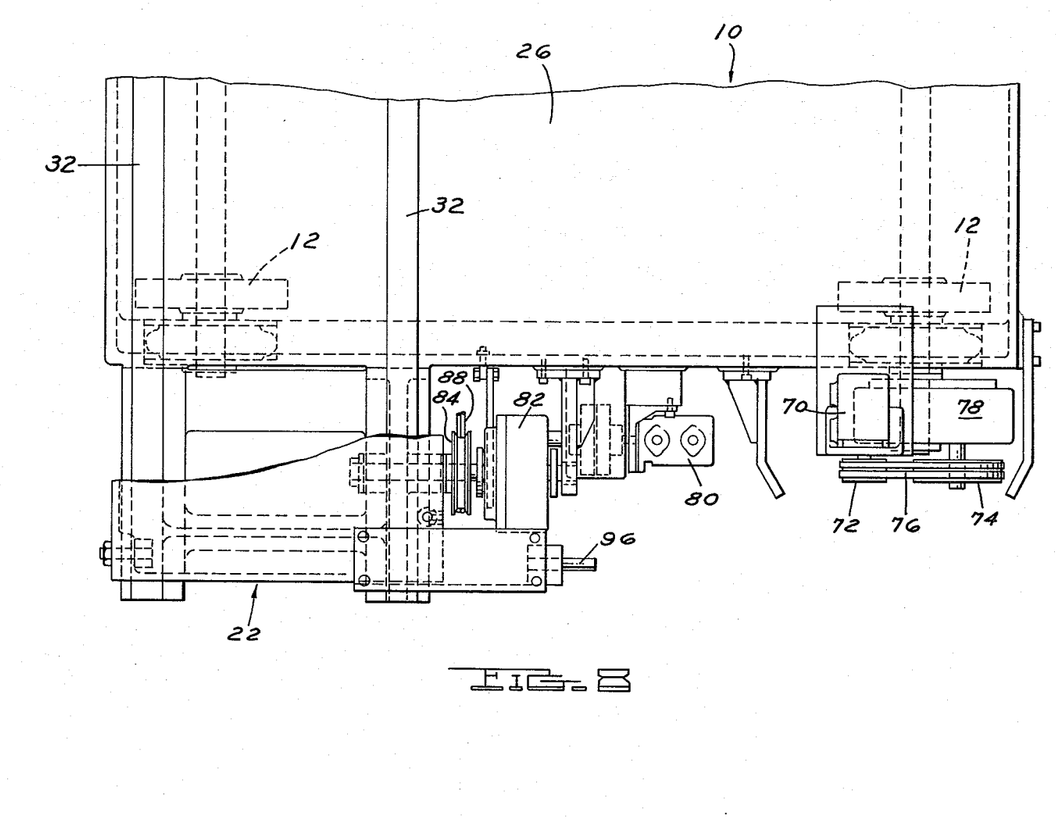
FIGURE 8 is a fragmentary plan view with parts broken away.
Figure 9:
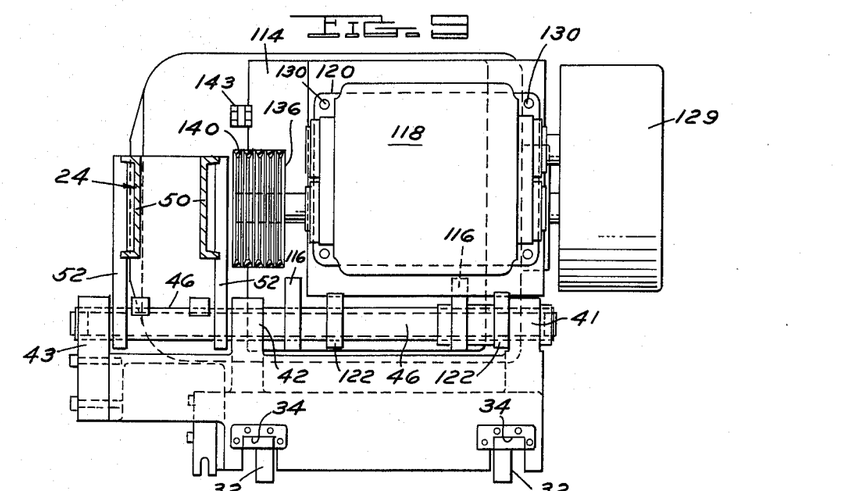
FIGURE 9 is a view taken substantially on the line 9—9 of FIGURE 1, and shows the saddle and power mechanism for rotating the grinding wheel, but omits portions of the connection between the power mechanism and the boom.

The transmission 118 has a second pulley 136 which drives a pulley 138 on the shaft 62 of the grinding wheel by means of a belt 140 extending over the pulleys. Actually the belt 140 is composed of a plurality of belt strands, as shown in FIGURES 2 and 9. Since both the grinding wheel 20 and pulley 138 are fixed on the shaft 62, the operation of motor 112 will result in a high speed rotation of the grinding wheel. The motor 112 is turned on and off by the operator through a suitable control on the panel 28, and means may also be provided to vary the rotation of the wheel so that its peripheral or surface speed can be kept the same despite a progressive reduction in the diameter of the wheel through normal wear.

The connection between the motor 112 and the transmission 118 provided by the screw 130 results in the motor and transmission turning as a unit on the shaft 46. The center of gravity of the combined power mechanism 110 composed of the motor 112 and transmission 118 and associated parts which pivot as a unit on shaft 46 is above and inwardly of the shaft 46, that is to the right thereof as viewed in FIGURES 1 and 10, so that the weight of the power mechanism applies a continuous tension on the driving belt 140. Accordingly, the belt will always be under a sufficient and satisfactory tension. The center of gravity of the boom 24 and associated structure including the grinding wheel is to the left of shaft 46 as viewed in FIGURES 1 and 10 so that the boom tends to move downwardly or counter-clockwise. However the tension in the belt 140 assists in sustaining or holding up the boom.

Figure 10:
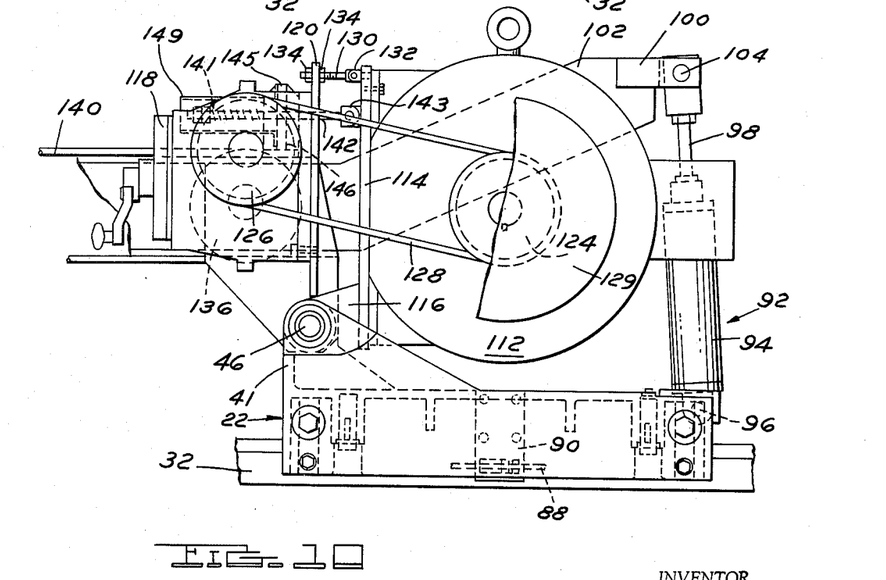
FIGURE 10 is a fragmentary elevational view of a portion of FIGURE 1, on an enlarged scale.
Figure 12:
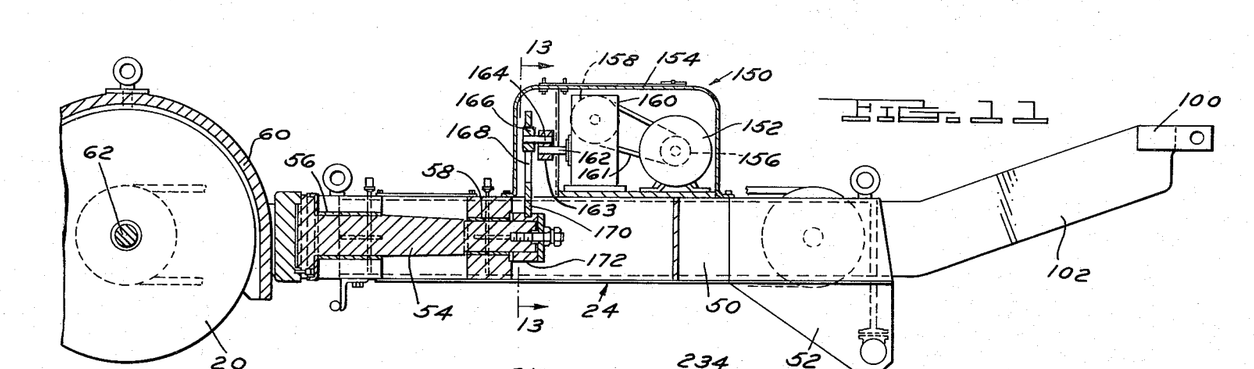
FIGURE 12 is a fragmentary plan view showing a portion of the structure in FIGURE 2 on an enlarged scale.

In order to control the tension and to prevent it from exceeding a desirable amount, a tension relieving device generally indicated at 141 in FIGURES 10 and 12, is provided. The device 141 comprises a rod 142 pivoted on a bracket 143 by pin 144. The bracket 143 is secured to mounting plate 114 of motor 112. The rod 142 is slidable in an opening formed in the plate 145 carried by bracket 146 which is mounted in fixed position on one of the boom channels 50. Nuts 147 are threaded on the free end of rod 142, and a coil spring 148 encircles the rod and is compressed between nuts 147 and plate 145. A housing 149 secured to plate 145 may be provided for the free end of the rod, the spring 148 and nuts 147. It will be apparent that some of the weight of the power mechanism 110 will be taken up by the compression coil spring 148. If there is too much tension on the belt 140 which drives the grinding wheel, the nuts 147 may be turned to further compress spring 148 and take up a greater part of the weight of the power mechanism 110 in the spring. Too little tension in the belt 140 can be taken care of by rotating the nuts 147 in the opposite direction to remove some of the compression from spring 148.

Figure 13:
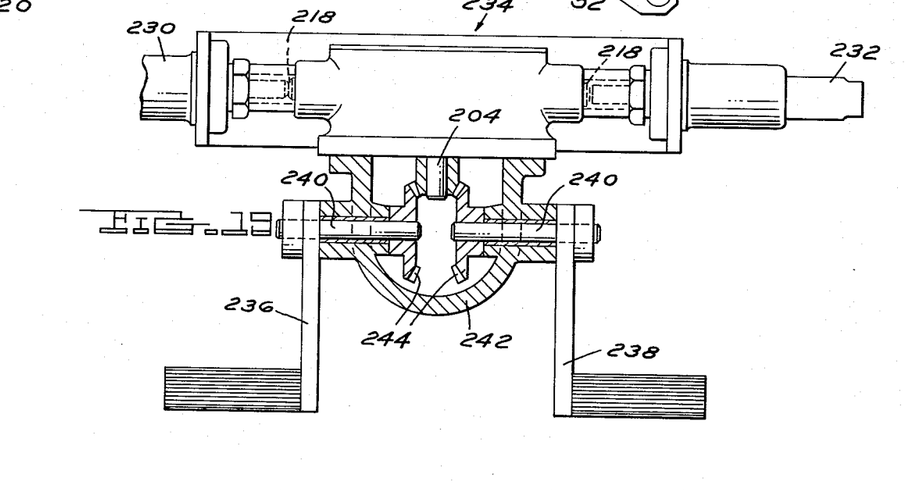
FIGURE 13 is a sectional view taken on the line 13—13 of FIGURE 11.

The grinding wheel may be oscillated back and forth about the longitudinal axis of the boom, and for this purpose an oscillating mechanism 150 (FIGURES 11 and 13) is mounted on the boom. The oscillating mechanism 150 includes an electric motor 152 within a housing 154. The motor 152 has a driving pulley 156 which rotates a pulley 158 on the transmission 160 through a belt 161. The output shaft 162 of the transmission has a block 163 which carries a pin 164 in offset parallel relation to shaft 162 so that the pin will describe a circle on rotation of the shaft. A rectangular follower 166 supported for rotation on the pin 164 is capable of sliding up and down in the elongated slot 168 provided in arm 170. The arm 170 is fixed to a collar 172 secured to spindle 54. Hence the rotation of transmission shaft 162 will effect an oscillating or back and forth tilting motion on the arm 170 within a small arc, which oscillating motion will be transmitted to the grinding wheel 20. The oscillating mechanism may be operated continuously to provide a continuous oscillation of the grinding wheel to form a crowned contour on the wheel face. The oscillating mechanism may also be employed simply to position the wheel either upright or at a predetermined angle to one side or the other of the vertical for grinding with the wheel in fixed upright or angled position. The oscillating mechanism can be turned on and off by the operator through suitable controls on the panel 28.

Figure 14:
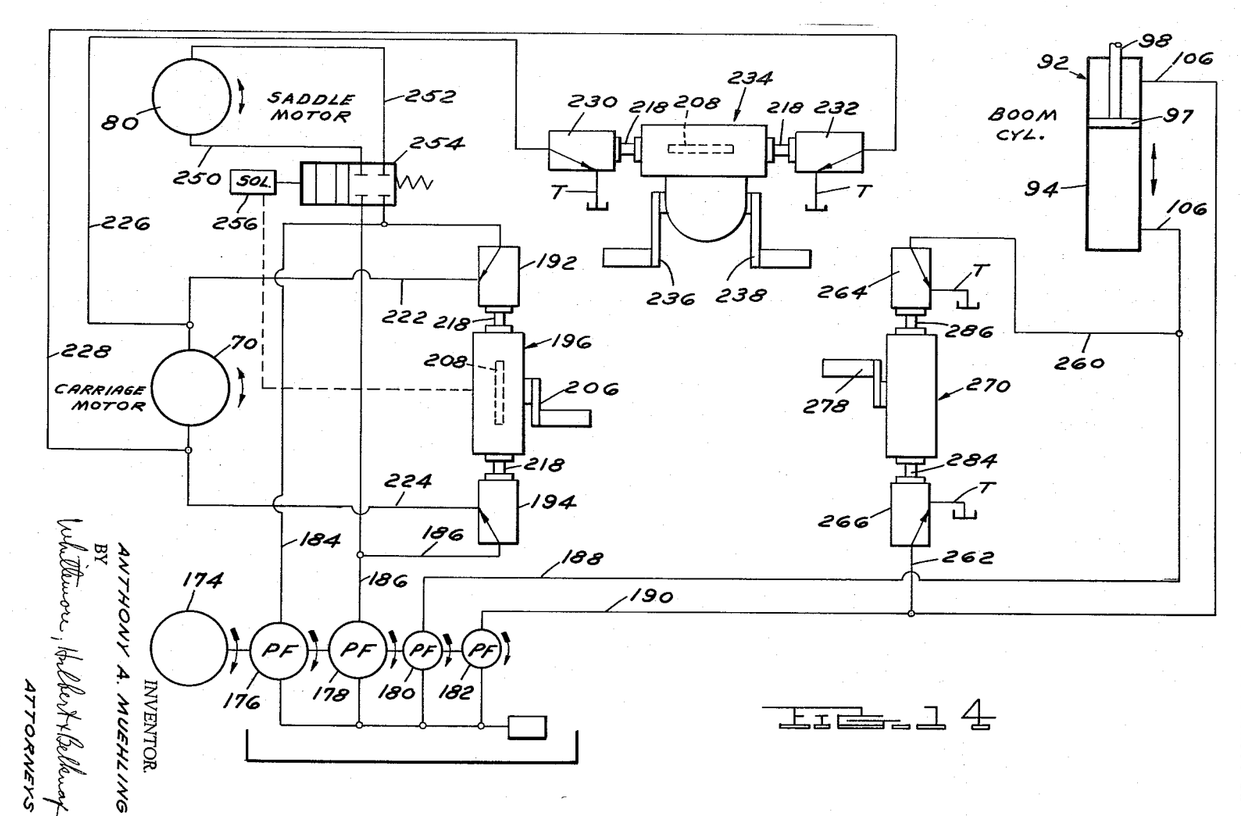
FIGURE 14 is a diagrammatic view of the hydraulic system for operating and controlling the various movements of the machine.
Figure 15:
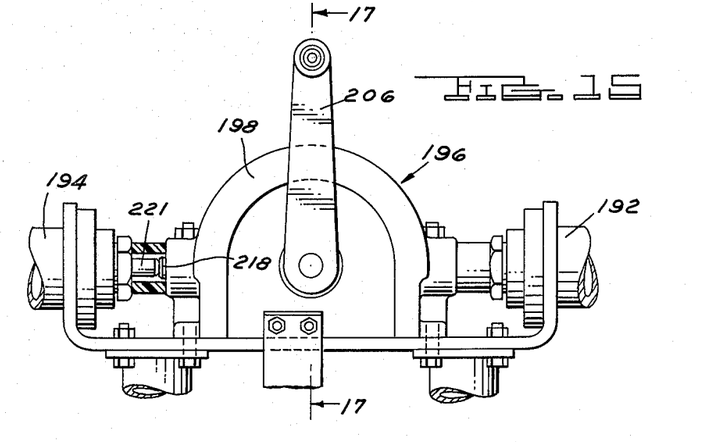
FIGURE 15 is a fragmentary elevational view with parts in section of one of the valve operating cam devices shown in FIGURE 14.
Figure 16:
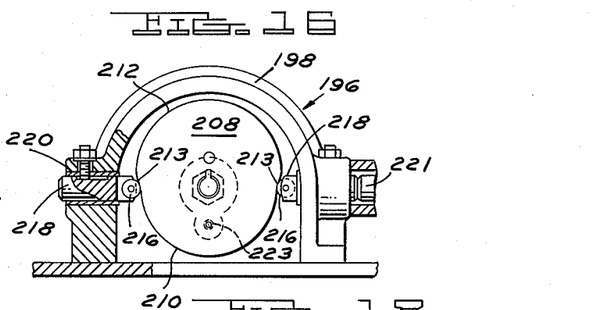
FIGURE 16 is a fragmentary elevation with parts in section looking in the direction of the arrow 16 in FIGURE 17.
Figure 17:
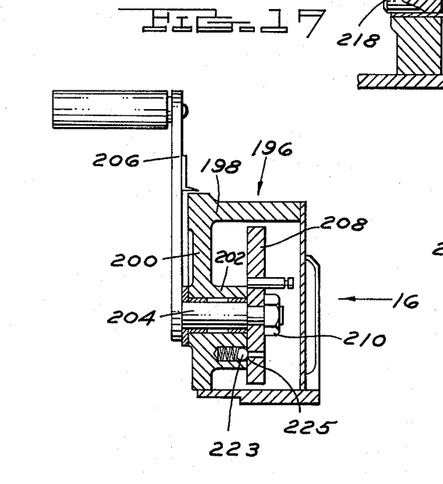
FIGURE 17 is a sectional view taken on the line 17—17 in FIGURE 15.

The hydraulic arrangement for controlling the various movements is diagrammatically shown in FIGURE 14. The motor 174 operates the pumps 176, 178, 180 and 182 to deliver hydraulic fluid into the lines 184, 186, 188 and 190. The lines 184 and 186 extend to the valves 192 and 194 which are manually operated by the cam control device 196. Cam device 196 is shown in detail in FIGURES 15–17, and comprises a housing 198 having a back wall 200 on which is formed an integral boss 202. A stub shaft 204 extends through the boss and is rotated by a handle 206. Within the housing the shaft 204 has a reduced portion on which is mounted a cam 208 having the shape illustrated in FIGURE 16. The cam is secured to the stub shaft by a nut 210 so that rotation of the handle 206 turns the cam a like amount. The cam 208 has an arcuate cam surface 210 of small diameter and an arcuate surface 212 of larger diameter, each arcuate surface extending throughout approximately 180°. There is a gradual rise from each end of the surface 210 leading to the full radius of surface 212, as indicated at 213. Normally, the cam assumes the position shown in FIGURE 16 in which the rollers or cam followers 216 on the plungers 218 engage the ends of the small diameter cam surface 210. The plungers slide in passages 220 formed in the side walls of the housing 198 and extend into the valves 192 and 194 to operate the pistons 221 within the latter, which urge the plungers toward the cam 208. In the FIGURE 16 position of the cam 208, the plungers position the valves 192 and 194 so that they pass the hydraulic fluid from lines 184 and 186 with little or no obstruction into lines 222 and 224. These latter lines extend to opposite sides of the carriage motor 70. When the cam 208 is rotated in one direction, one of the followers 218 rides over the high surface 212 of the cam to close the associated valve 192 or 194 thereby closing communication through that valve. The valve which closes is moved gradually to closed position as the follower rides up the rise 213 of the cam. The other plunger 218 does not move since it rides on the low surface 210 of the cam. A spring pressed ball 223 engages a depression 225 in the cam 208 when the cam is in the FIGURE 16 position, so that the operator can "feel" when the cam is in neutral.

Lines 226 and 228 extend from the lines 222 and 224 to the valves 230 and 232 respectively. These valves are controlled by a cam device 234 which is substantially the same as the cam device 196 except that it is operated by foot pedals instead of a hand lever. Therefore, FIGURE 16 may be considered as showing the details of the cam device 234 and, in the description of cam device 234 which follows, the parts will be described by the same reference numerals as used to describe cam device 196. In the neutral position of the cam devices 234 (the position shown in FIGURE 16), its cam 208 locates the plungers 218 so that they open both valves, as shown in FIGURE 14, opening the lines 226 and 228 to tank T. When the cam 208 of device 234 is turned in one direction from neutral, one of the plungers 218 is operated by the high surface of the cam to close the associated valve. The other valve remains open because the associated plunger remains on the low surface of the cam. Reverse rotation of the cam operates the other of the valves 230, 232.

Foot pedals 236 and 238 are secured to shafts 240 which rotate in bearings in the housing 242, and bevel gears 244 on the inner ends of the shafts mesh with a pinion on the shaft 204 which carries the cam. Hence when one of the pedals is depressed the cam is rotated in one direction from neutral, and when the other pedal is depressed the cam is turned in the opposite direction.

The hydraulic fluid lines 184 and 186 communicate with lines 250 and 252 leading to the saddle motor 80. A valve 254 controls the lines 250 and 252 and is normally spring urged to the position illustrated in FIGURE 14 in which it closes the lines 250 and 252 so that hydraulic fluid can pass neither to nor from the motor through these lines. A solenoid 256 when energized moves the valve 254 to open the lines 250 and 252, and the solenoid is energized by the handle 206 of cam device 196 whenever it is shifted away from neutral position.

The lines 188 and 190 lead to conduits 106 and 108 which communicate with the opposite ends of the boom cylinder 94. The lines 260 and 262 lead from lines 188 and 190 to tank T through the valves 264 and 266. The valves 264 and 266 are controlled by a cam device 270 shown in FIGURE 18. Inside the housing 272 of the cam device, there is a cam 274 fixed on a shaft 276 which is adapted to be rotated by a handle 278 fixed on the end of the shaft which projects from the housing. The cam device also includes roller followers 280 and 282 which are mounted on plungers 284 and 286 which slide in passages formed in the wall of housing 272. These plungers engage pistons 288 of the valves 264 and 266, as was the case with the cam devices 196 and 234, and these pistons urge the plungers in an inward direction toward the cam so that there is always contact between the rollers and the cam surface.

The cam 274 has an arcuate surface 290 which is of uniform radius and extends from the point 292 to the point 294. The remaining peripheral surface of the cam between the points 292 and 294 is designated 296 and is of non-uniform radius. The radius of this surface increases progressively from the point 292 to the high point 298, and also increases progressively from the point 294 to the high point. The dot-dash arc 300 is drawn on the same radius as surface 290 to illustrate the progressively changing radius of the surface 298.

Figure 18:
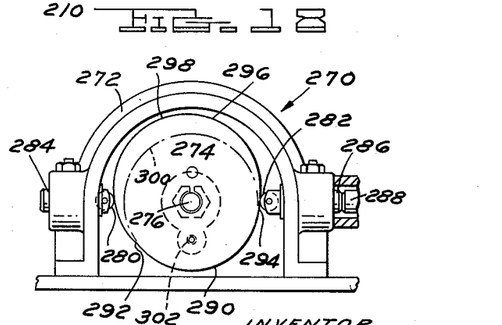
FIGURE 18 is similar to FIGURE 17, but shows another of the cam devices.

The cam 294 is shown in its neutral position in FIGURE 18 in which a ball 302 carried by housing 272 engages a depression in the cam to hold it releasably in the neutral position, so that the operator can "feel" the neutral position. When either follower 280 or 282 engages the small radius surface 290 of the cam, its associated valve 264 and 266 is fully open, that is in the position of valve 264 shown diagrammatically in FIGURE 14. As the follower climbs the surface 298, it gradually restricts the flow through the associated valve. The cam device 270 as shown in FIGURE 18 is in its neutral position in which the follower 282 causes valve 264 to be substantially fully open to tank, and follower 280 causes valve 266 to be partially restricted. It will be understood that counter-clockwise rotation of valve 270 from the neutral position shown will further restrict the flow through valve 266, increasing the pressure in line 190, without affecting the position of valve 264. On the other hand clockwise rotation of cam 274 will cause a gradual increase in restriction of valve 264, correspondingly increasing the pressure in line 260, while decreasing the restriction of valve 266.

OPERATION

To operate the machine, the operator will seat himself before the control panel 28 in position to regulate the various controls. Normally, the carriage is moved back and forth along the tracks 16 with the periphery of the grinding wheel in contact with the workpiece W, so that the grinding wheel will grind a path along the length of the workpiece. It is understood of course that the motor 112 will be operating during this time to rotate the grinding wheel at a high rate of speed. In order to cause the carriage to move in one direction along the tracks 16, one of the pedals 236, 238 is depressed to rotate the cam 208 of the cam control device 234 in one direction. Assuming the cam 208 is rotated clockwise, the valve 232 will close to allow pressure to build up in the line 228 on one side of the carriage motor 70. Pressure in the line 226 on the opposite side of the carriage motor will be relieved through the open valve 230 so that the carriage motor will rotate in one direction. It is not necessary that the valve 232 close all the way; only that it close enough to build up sufficient pressure in the line 228 to operate the carriage motor. While the surface 212 of the cam could be graduated so that the build-up of pressure in the line 228 or 226 could be controlled, this of course is not necessary since ordinarily there is an optimum speed at which the grinding wheel should traverse the length of the work. Obviously, instead of a graduated cam surface 212, an altogether different cam could be substituted where a different speed of carriage travel is desired. Counter-clockwise rotation of cam 208 in the control device 234 will cause the valve 230 to close, or at least partially close, to build up pressure in the line 226 at the opposite side of the carriage motor. Since the valve 232 will remain open, the pressure in line 228 will not build up and therefore the differential pressure on carriage motor 70 will cause it to rotate in the opposite direction. The counter-clockwise rotation of cam 208 is effected by depressing the other of the pedals 236, 238. Hence the carriage motor 70 is operated in one direction or the other, depending on which foot pedal 236, 238 is depressed, and the carriage 10 is thereby moved along its tracks in one direction or the other. When the pedals 236, 238 are in the neutral position, in which the cam 208 is releasably held in the neutral position shown in FIGURE 16 by the ball detent 223, both valves 230 and 232 will be open relieving the pressure at both sides of the carriage motor 70, so that the carriage will not move in either direction. There will be a gradual acceleration of the carriage upon reversal by reason of the sloping surfaces 213 which provide for a smooth and gradual increase in fluid restriction and a corresponding pressure increase. There is therefore little shock or jolting of the equipment by reason of reversal of the carriage or starting and stopping.

The valves 230 and 232 have been described as being open in the neutral position of the cam control device 234. It will be understood that if desired, these valves, in neutral position, may be partially closed providing a partial restriction in the two lines 226, 228 to prevent rotation of the carriage motor 70 and hence brake the carriage against movement. The same may be said for valves 192 and 194.

The saddle motor 80 will normally be cut off from the pressure lines by valve 254 in the position of FIGURE 14 so that the saddle will remain in a fixed position during carriage traverse. However, at the end of the carriage movement in one direction or the other, that is when the grinding wheel reaches an end of the workpiece, the saddle will normally be indexed or moved out a small amount so that upon reversal of the carriage motor 70 the grinding wheel will grind a new path along the length of the work parallel to the preceding path.

In order to move the saddle 22, the cam control device 196 is operated by the hand lever 206 to rotate the cam 208 thereof in one direction or the other. The solenoid 256 is energized by handle 206 whenever it is rotated from the neutral position shown in FIGURE 16, and energization of the solenoid shifts valve 254 to open communication between the pressure lines 184, 196 and lines 250, 252 leading to the saddle motor 80. When cam 208 is rotated in a clockwise direction, it closes, or at least partially closes, valve 194 to cause pressure to build up in the line 250 to one side of the saddle motor. Since the pressure in line 252 is relieved through valve 192 the saddle motor will turn in one direction to move the saddle. The operator will ordinarily only momentarily move the lever 206 away from the neutral position and then return it to neutral so that the valve 194 will return to its normally open position and the valve 254 will close and thereby lock the saddle 22 against movement. Rotation of cam 208 in the opposite direction from neutral will of course close, or at least partially close, valve 92 to cause pressure to build up in the line 252. Since the pressure in line 250 will be relieved through valve 194, the saddle motor will turn in the opposite direction. There will be a gradual acceleration or deceleration of the saddle when its movement is started or stopped by reason of the sloping cam surfaces 213, as explained above in connection with the description of the movement of the carriage.

The operator may start and stop the oscillating motor 152 whenever he desires. If he wishes to grind on the corner of the wheel, he can momentarily operate the motor 152 to "jog" the oscillating mechanism so as to tilt the wheel to the desired position. He may also operate the oscillating mechanism continuously by a continuous energization of motor 152 to cause the grinding wheel to oscillate or tilt back and forth through a limited arc which may be on the order of 15° to 20°, for example. Oscillation may proceed continuously during carriage movement, or while both the carriage and saddle are stationary to grind out a particularly bad spot such as a deep seam.

The cam control device 270 is employed to control the elevation of the boom 24 and hence of the grinding wheel 20. The boom with its associated parts, including the grinding wheel, overbalances the power mechanism 110 for rotating the grinding wheel, and hence these parts will tend to move in a counter-clockwise direction as viewed in FIGURE 1. In other words, although the tension in belt 140 developed by the weight of the power mechanism urges the boom and grinding wheel upwardly, the boom and the grinding wheel will nevertheless tend to move downward unless additional support is provided. The cam control device 270 is designed so that in the neutral position of FIGURE 18 sufficient pressure is developed in the line leading to the upper or rod end of the cylinder 94 to offset the out-of-balance condition of the boom and its wheel driving mechanism. As seen in FIGURES 14 and 18, the cam control device 270 when in neutral position partially closes the valve 266 while opening the valve 264. The pressure thereby delivered through line 106 to the upper end of the cylinder 94 is enough to hold the boom in any given position of elevation. When it is desired to elevate the boom, the hand lever 278 is rotated to turn the cam 274 counter-clockwise, thereby causing follower 280 to climb the cam surface 298 and gradually increase the pressure at the upper end of cylinder 94.

In order to apply downward pressure to the grinding wheel so as to engage the work under a predetermined load, the cam 274 is rotated by lever 278 in a clockwise direction causing follower 282 to climb up the cam surface 296 and the follower 280 to move down the same cam surface. Hence the valve 264 will become progressively more and more restricted, building up pressure at the lower end of cylinder 94, and valve 266 will gradually move towards a full open position, relieving the pressure at the upper end of the cylinder. The lever 278 may be calibrated so that by its position the operator can determine how much pressure is applied to the work by the grinding wheel.

If the operator should desire increased or reduced tension on the belt 140, he need simply turn the nuts 147 in one direction or the other to vary the tension on spring 148. Likewise the tension on transmission belt 128 can be adjusted by nuts 134. Should the operator desire, for any reason, to remove the belt 140, he should prop up the motor 112 by blocks placed between the motor and the carriage platform 26 so that the motor cannot move clockwise, and then upon elevation of the boom by operation of cylinder 94, the distance between transmission pulley 136 and the pulley 138 on the grinding wheel shaft will shorten sufficiently to allow the belt 140 to be removed.

What I claim as my invention is:

1. A machine for removing metal from a workpiece comprising a carriage movable along a predetermined path, a saddle supported on said carriage for movement in forward and rearward directions transversely of the path of movement of said carriage, a boom, means pivotally mounting said boom on said saddle for vertical swinging, said boom extending forwardly from said pivotal mounting means, a grinding wheel mounted on said boom adjacent the forward end thereof, power mechanism for rotating said grinding wheel having a driving pulley, means pivotally mounting said power mechanism on said saddle, said grinding wheel having a pulley, a belt extending over said pulleys to transmit rotation to said grinding wheel from said power mechanism, said boom and power mechanism being capable of pivoting relative to each other, said power mechanism being so pivoted on said saddle that the weight thereof tensions said belt and the tensioning of said belt urges said boom upwardly about its axis of vertical swinging.

2. A machine for removing metal from a workpiece comprising a carriage movable along a predetermined path, a saddle supported on said carriage for movement in forward and rearward directions transversely of the path of movement of said carriage, a boom, means pivotally mounting said boom on said saddle for vertical swinging, said boom extending forwardly from said pivotal mounting means, a grinding wheel mounted on said boom adjacent the forward end thereof, power mechanism for rotating said grinding wheel having a driving pulley spaced above the level of the axis of vertical swinging of said boom, means pivotally mounting said power mechanism on said saddle, a second pulley adjacent the forward end of said boom connected to said grinding wheel, a belt extending over said pulleys to transmit rotation to said grinding wheel from said power mechanism, said boom and power mechanism being capable of pivoting relative to each other, said power mechanism being so pivoted on said saddle that the weight thereof tensions said belt and the tensioning of said belt urges said boom upwardly about its axis of vertical swinging, said axis of vertical swinging of said boom and the axis of the pivotal mounting means of said power mechanism being coincident.

3. A machine for removing metal from a workpiece comprising a carriage movable along a predetermined path, a saddle supported on said carriage for movement in forward and rearward directions at right angles to the path of movement of said carriage, a pivot shaft on said saddle extending parallel to the carriage path, a boom mounted on said pivot shaft for swinging movement about the axis thereof and extending forwardly from said shaft, a grinding wheel mounted on said boom adjacent the forward end thereof for rotation about an axis generally parallel to said pivot shaft, power mechanism for rotating said grinding wheel, said power mechanism being pivotally mounted on said shaft and having a driving pulley above the level of said shaft, said grinding wheel having a pulley, a belt extending over said pulleys to transmit rotation to said grinding wheel from said power mechanism, said boom and power mechanism being capable of pivoting relative to each other about said shaft, said power mechanism having its center of gravity rearwardly of said shaft so that the weight of said power mechanism will tension said belt and the tensioning of said belt will urge said boom upwardly about said shaft.

4. The machine defined in claim 3, wherein means are provided for relieving the tension on said belt.

5. The machine defined in claim 4, wherein said tension relieving means comprises a resilient connection between said boom and said power mechanism.

6. A machine for removing metal from a workpiece comprising a carriage movable along a predetermined path, laterally spaced, horizontal, parallel tracks on said carriage extending in forward and rearward directions at right angles to the path of movement of said carriage, a saddle mounted on said tracks for forward and rearward reciprocation, a horizontal pivot shaft on said saddle extending parallel to the path of movement of said carriage, a boom pivoted at its rear end to said shaft for vertical swinging and extending forwardly therefrom, a grinding wheel mounted on the forward end of said boom for rotation about an axis generally parallel to the path of movement of said carriage, means for oscillating said wheel through a limited arc about the boom axis, a power mechanism pivoted on said shaft and having an output pulley above the level of said shaft, a pulley on the forward end of said boom connected to said grinding wheel, a belt extending over said pulleys to transmit rotation to said grinding wheel from said power mechanism, said boom and power mechanism being capable of pivoting relative to each other about said shaft, said power mechanism being positioned so that its center of gravity is above and rearwardly of said shaft whereby the weight of said mechanism will tension said belt and the tensioning of said belt will urge said boom upwardly about said shaft.

7. The machine defined in claim 6, wherein said boom is pivoted to one end of said shaft and said power mechanism is pivoted to the other end thereof.

8. The machine defined in claim 7, wherein means are provided for partially relieving the tension on said belt including a rod extending between said power mechanism and said boom having a pivot connection with the one and a sliding connection with the other, and adjustable spring means resisting sliding of said rod.

9. A machine for removing metal from a workpiece comprising support structure, a boom, means pivotally mounting said boom on said supporting structure for vertical swinging, said boom extending forwardly from said pivotal mounting means, a grinding wheel mounted on said boom spaced forwardly from said pivotal mounting means, power mechanism for rotating said grinding wheel having a driving pulley, means pivotally mounting said power mechanism on said support structure, said grinding wheel having a pulley, a belt extending over said pulleys to transmit rotation to said grinding wheel from said power mechanism, said boom and power mechanism being capable of pivoting relative to each other, said power mechanism being so pivoted on said support structure that the weight thereof tensions said belt and the tensioning of said belt urges said boom upwardly about its axis of vertical swinging.

10. The mechanism defined in claim 9, wherein the axis of vertical swinging of said boom and the axis of the pivotal mounting means of said power mechanism are coincident.

11. A machine for removing metal from a workpiece comprising support structure, a horizontal pivot shaft mounted on said support structure, a boom mounted on said pivot shaft for swinging movement about the axis thereof and extending forwardly from said shaft, a grinding wheel mounted on said boom adjacent the forward end thereof for rotation about an axis generally parallel to said pivot shaft, power mechanism for rotating said grinding wheel, said power mechanism being pivotally mounted on said shaft and having a driving pulley above the level of said shaft, said grinding wheel having a pulley, a belt extending over said pulleys to transmit rotation to said grinding wheel from said power mechanism, said boom and power mechanism being capable of pivoting relative to each other about said shaft, said power mechanism having its center of gravity rearwardly and above the level of said shaft so that the weight of said power mechanism will tension said belt and the tensioning of said belt will urge said boom upwardly about said shaft.

12. The machine defined in claim 11, wherein means are provided for relieving the tension of said belt.

13. The machine defined in claim 12, wherein said tension relieving means comprise a resilient connection between said boom and said power mechanism.

References Cited by the Examiner

UNITED STATES PATENTS

| | | | |
|---|---|---|---|
| 1,563,712 | 12/1925 | Johnson | 51—134.5 |
| 2,347,503 | 4/1944 | Platt | 51—99 |
| 2,627,704 | 2/1953 | Whitehouse | 51—47 |
| 2,704,913 | 3/1955 | Soderlund | 51—47 |
| 2,922,258 | 1/1960 | Bass et al. | 51—134.5 X |
| 2,955,388 | 10/1960 | Lavner | 51—99 X |
| 2,984,952 | 5/1961 | Gebel | 51—165.03 |
| 3,052,069 | 9/1962 | Grzymek | 51—165.03 |
| 3,053,018 | 9/1962 | Tracy | 51—99 X |
| 3,089,287 | 5/1963 | Dilks | 51—99 X |

FOREIGN PATENTS

| | | |
|---|---|---|
| 526,204 | 5/1955 | Italy. |
| 164,127 | 7/1958 | Sweden. |
| 166,501 | 3/1959 | Sweden. |
| 171,807 | 6/1960 | Sweden. |

ROBERT C. RIORDON, *Primary Examiner.*

JOHN C. CHRISTIE, LESTER M. SWINGLE,
*Examiners.*